US007345442B2

(12) United States Patent
Ta et al.

(10) Patent No.: US 7,345,442 B2
(45) Date of Patent: Mar. 18, 2008

(54) DEVICE FOR CONTROLLING ELECTRIC-MOTOR POWER STEERING DEVICE

(75) Inventors: CaoMinh Ta, Gunma (JP); Hiroaki Takase, Gunma (JP); Hideyuki Kobayashi, Gunma (JP)

(73) Assignees: NSK Ltd., Tokyo (JP); NSK Steering Systems Co., Ltd., Tokyo (JP)

( * ) Notice: Subject to any disclaimer, the term of this patent is extended or adjusted under 35 U.S.C. 154(b) by 0 days.

(21) Appl. No.: 10/569,976

(22) PCT Filed: Sep. 1, 2004

(86) PCT No.: PCT/JP2004/013081

§ 371 (c)(1),
(2), (4) Date: May 22, 2006

(87) PCT Pub. No.: WO2005/023626

PCT Pub. Date: Mar. 17, 2005

(65) Prior Publication Data

US 2007/0029959 A1 Feb. 8, 2007

(30) Foreign Application Priority Data

Sep. 2, 2003 (JP) ............................... 2003-310131

(51) Int. Cl.
*B62D 5/04* (2006.01)
*B62D 6/00* (2006.01)
(52) U.S. Cl. ...................... 318/432; 318/621; 318/632; 180/446
(58) Field of Classification Search ................ 318/293, 318/430–434, 621, 632; 180/6.28, 443, 446; 363/74, 78, 95, 97, 98
See application file for complete search history.

(56) References Cited

U.S. PATENT DOCUMENTS

| 4,509,611 | A | * | 4/1985 | Kade et al. ................. 180/446 |
| 4,809,173 | A | * | 2/1989 | Fukami et al. ............... 701/43 |
| 6,427,104 | B1 | * | 7/2002 | Matsushita et al. .......... 701/41 |
| 6,874,595 | B2 | * | 4/2005 | Mukai et al. ............... 180/446 |
| 6,883,637 | B2 | * | 4/2005 | Nishizaki et al. ........... 180/446 |

(Continued)

FOREIGN PATENT DOCUMENTS

JP 4-265668 A 9/1992

(Continued)

OTHER PUBLICATIONS

The analysis and Compensation of dead-time effects in three phase PWM inverters, Lazhar Ben-Brahim, 1998 IEEE pp. 792-797 Jul. 1998.

*Primary Examiner*—Bentsu Ro
(74) *Attorney, Agent, or Firm*—Sughrue Mion, PLLC

(57) ABSTRACT

Distortions of motor voltage and current and a torque ripple of the motor are generated by dead band compensation for preventing an arm short circuit of an inverter, and a feeling of physical disorder is given in a handle operation. Therefore, the distortions of the motor voltage and current and the torque ripple of the motor are improved by using the dead band compensation for estimating the voltage distortion on the basis of a model current generated from a current command value such that no feeling of physical disorder is given in the handle operation of an electric power steering apparatus.

8 Claims, 15 Drawing Sheets

U.S. PATENT DOCUMENTS

| | | | |
|---|---|---|---|
| 2006/0015228 A1* | 1/2006 | Lange | 701/41 |
| 2006/0015229 A1* | 1/2006 | Lange et al. | 701/41 |

FOREIGN PATENT DOCUMENTS

| | | |
|---|---|---|
| JP | 8-142884 A | 6/1996 |
| JP | 9-84385 A | 3/1997 |
| JP | 9-261974 A | 10/1997 |
| JP | 2001-37282 A | 2/2001 |
| JP | 2002-223600 A | 8/2002 |
| JP | 2003-40128 A | 2/2003 |
| JP | 2003-319681 A | 11/2003 |
| JP | 2004-201414 A | 7/2004 |

* cited by examiner

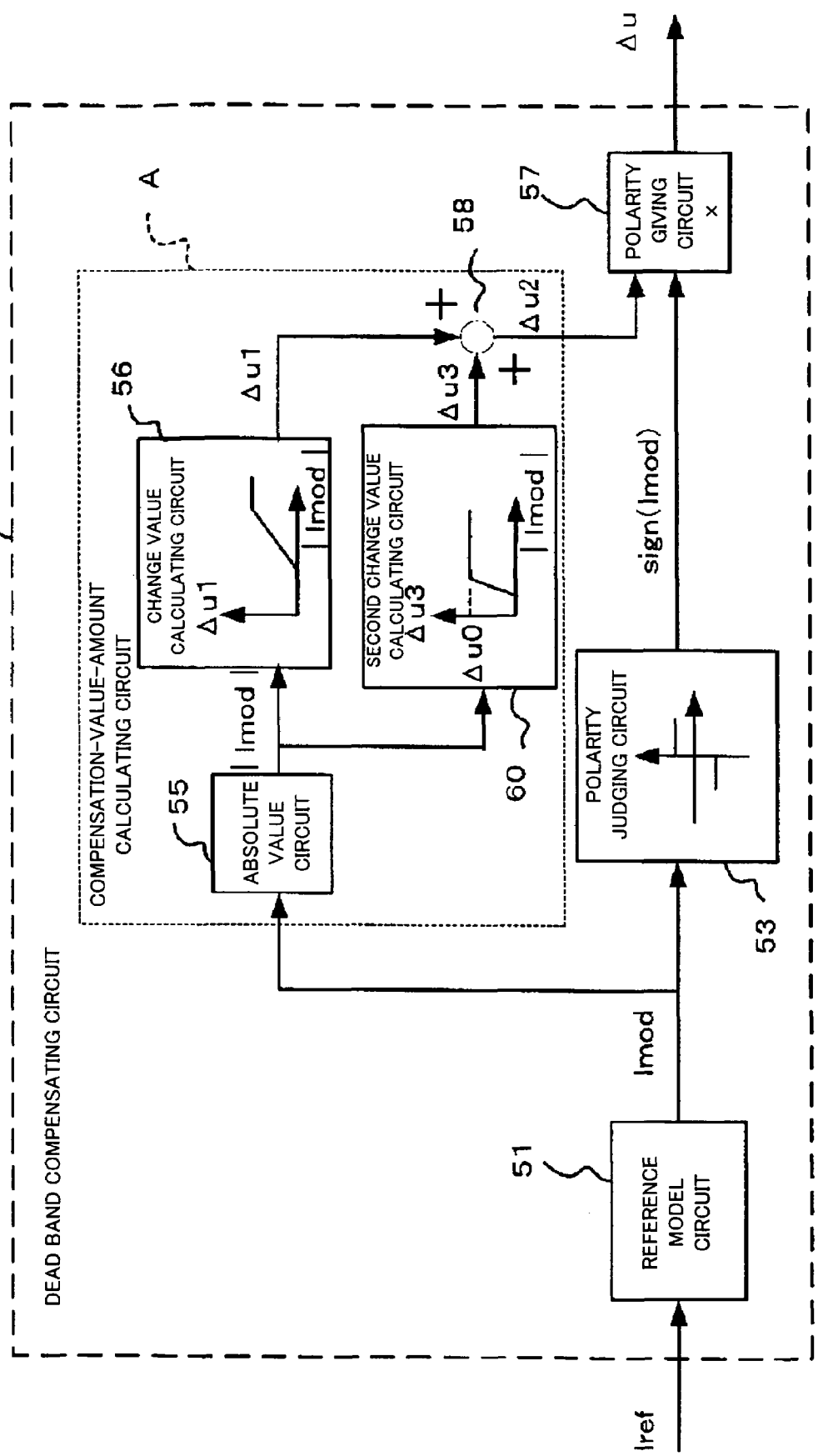

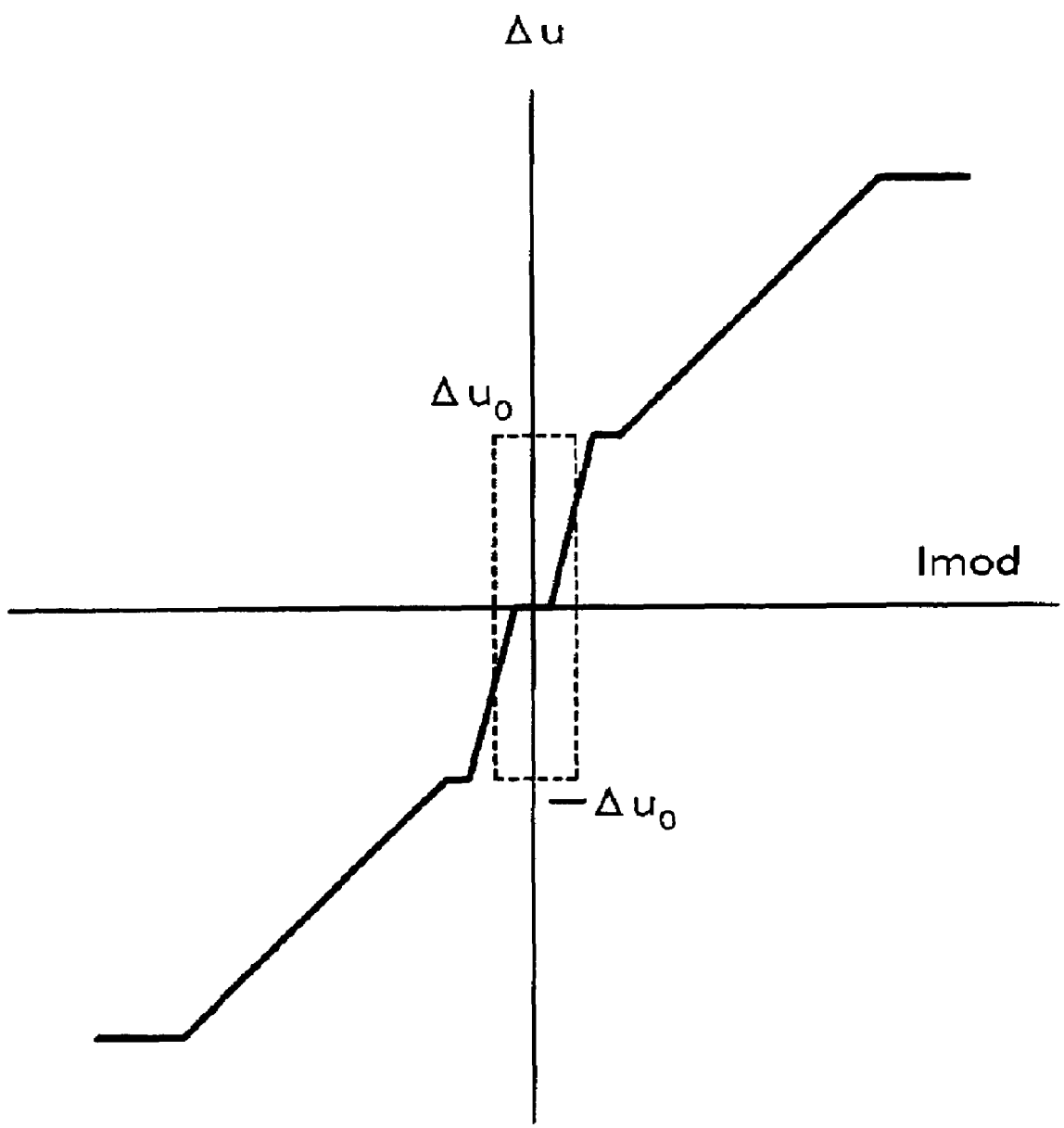

DEVICE FOR CONTROLLING ELECTRIC-MOTOR POWER STEERING DEVICE

TECHNICAL FIELD

The present invention relates to a controller of an electric power steering apparatus in which a steering assist force caused by a motor is given to a steering system of an automobile or a vehicle, and particularly, relates to a controller of an electric power steering apparatus for improving dead band control of an inverter for driving the motor.

BACKGROUND TECHNIQUE

In the electric power steering apparatus for energizing assist force by rotation force of the motor in a steering apparatus of the automobile or the vehicle, the assist force is energized to a steering shaft or a rack shaft by a transmission mechanism of a gear or a belt, etc. through a speed reduction gear with respect to driving force of the motor. An inverter, etc. are used in a motor driving circuit to supply a current to the motor so as to generate a predetermined desirable torque by this motor.

Here, FIG. 1 shows a basic construction of an electric power steering apparatus disclosed in a Japanese patent literature (JP-A-8-142884). FIG. 2 shows the details of a motor driving circuit within this electric power steering apparatus. In FIG. 1, torque detected by a torque sensor 103 is inputted to a phase compensator 121, and a torque command value is calculated. Next, the torque command value is inputted to a current command calculating element 122. A vehicle speed detected by a vehicle speed sensor 112 is added and a current command value Iref is calculated by the current command calculating element 122. In this control, feedback control is adopted. A current Imes of a motor 110 as a control object is detected by a motor current detecting circuit 142, and is fed back to a comparator 123. The current Imes is then compared with the current command value Iref, and an error is calculated. So-called proportion integration control of this error is performed by a proportion calculating element 125 and an integration calculating element 126. The current command value is inputted to a differentiating compensator 124 for improving a transient response. The respective outputs of the differentiating compensator 124, the proportion calculating element 125 and the integration calculating element 126 are added by an adder 127, and a current control value E is calculated. A motor driving circuit 141 supplies a current to the motor 110 on the basis of the current control value E as an input value. A battery 114 is an electric power source of the motor driving circuit.

FIG. 2 shows details of the motor driving circuit 141. The motor driving circuit 141 is comprised of an inverter unit constructed by FET as a switching element, and a gate control unit for controlling the operation of gate of FET. The inverter unit comprises an H-bridge which is constructed by a up-and-down arm constructed by FET1 and FET3, or a up-and-down arm constructed by FET2 and FET4. In the gate control unit, the current control value E is inputted to a converting unit 130, and a timing signal with respect to each FET is generated and inputted to gate driving circuits 133a, 134a, 133b, 134b. Thus, a gate signal able to operate gate of FET is generated. However, the timing signal generated by the converting unit 130 is not directly inputted to the gate driving circuits 134a and 134b, but is respectively inputted to a dead time circuit 131 and a dead time circuit 132 because of the following reasons.

Each up-and-down arm constituting the inverter unit, e.g., FET1 and FET3 are alternately repeatedly turned on and off. Similarly, FET2 and FET4 are alternately repeatedly turned on and off. However, the FET is not an ideal switch. Therefore, no FET is turned on and off in a moment in accordance with indication of the gate signal, but a turn-on time and a turn-off time are required. Therefore, when the indication of turning-on FET1 and the indication of turning-off FET3 are simultaneously performed, a problem exists in that FET1 and FET3 are simultaneously turned on and the up-and-down arm is short-circuited. Therefore, when an off-signal is given to the gate driving circuit 133a so as not to simultaneously turn-on FET1 and FET3, an on-signal is not immediately given to the gate driving circuit 134a, but is given to the gate driving circuit 134a by putting the pause of a predetermined time called a so-called dead time by the dead time circuit 131. Thus, the up-and-down short circuit of FET1 and FET3 is prevented. This also similarly hold true in FET2 and FET4.

However, the existence of this dead time becomes a cause generating the problem of torque insufficiency and a torque ripple in the control of the electric power steering apparatus. This problem will next be explained in detail.

First, FIGS. 3A to 3D show the relation of the dead time, the turn-on time and the turn-off time. In FIGS. 3A to 3D, a signal K is basically set to on and off signals with respect to FET1 and FET3. However, in reality, a gate signal K1 is given to FET1, and a gate signal K2 is given to FET2. Namely, the dead time Td is secured. A phase voltage constructed by FET1 and FET2 is set to Van. Even when the on-signal due to the gate signal K1 is given, the FET is not immediately turned on, but is turned on after a turn-on time Ton is required. On the other hand, even when the off-signal is given, the FET is not immediately turned off, but is turned off after a turn-off time Toff is required. Vdc is an electric power voltage of the inverter.

Accordingly, a total delay time Ttot is expressed by the following expression 1.

$$Ttot = Td + Ton - Toff \qquad \text{[Expression 1]}$$

Here, the turn-on time Ton and the turn-off time Toff are changed by kinds, capacities, etc. of used FET and IGBT, etc. Further, the dead time Td is generally a value greater than the turn-on time Ton and the turn-off time Toff.

Next, an influence affected by this dead time Td will be explained.

First, there is the following influence in the influence with respect to the voltage. As shown in FIGS. 3A to 3D, the actual gate signals K1 and K2 with respect to an ideal gate signal K differ from the gate signal K by the influence of the dead time Td. Therefore, distortion is generated in the voltage. However, a value ΔV of this distortion voltage is shown in expression 2 when the direction of a motor current is positive (when the current is directionally flowed from the electric power source to the motor). The value ΔV is shown in expression 3 when the direction of the current is negative (when the current is directionally flowed from the motor to the electric power source).

$$-\Delta V = -(Ttot/Ts) \cdot (Vdc/2) \qquad \text{[Expression 2]}$$

Where, Ts is an inverse number Ts=1/fs of a PWM frequency fs when the inverter is PWM-controlled.

$$\Delta V = (Ttot/Ts) \cdot (Vdc/2) \qquad \text{[Expression 3]}$$

When the above expressions 2 and 3 are represented by one expression, the following expression 4 is formed.

$$\Delta V = -\text{sign}(Is) \cdot (Ttot/Ts) \cdot (Vdc/2) \quad \text{[Expression 4]}$$

Here, sign(Is) represents the polarity of the motor current.

It is derived from the expression 4 that the influence of the dead time Td with respect to the distortion voltage ΔV greatly appears as the frequency fs is high and the electric power voltage Vdc is small.

The influence of the dead time Td with respect to the voltage distortion has been explained. However, with respect to the current or torque, there is an unpreferable influence affected by the dead time Td. With respect to the current distortion, when the current is changed from the positive current to the negative current or is changed from the negative current to the positive current, a phenomenon (zero clamping phenomenon) for fixing the current to the vicinity of zero is generated by the dead time Td. This is because there is a tendency intended to maintain the current to be zero by a reduction in voltage due to the dead time Td since load (motor) is inductance.

Further, output deficiency of torque and an increase of the torque ripple appear as the influence of the dead time Td with respect to torque. Namely, the current distortion causes a higher harmonic wave of a low order and this generation results in the increase of the torque ripple. Further, the output deficiency of torque is generated since the real current influenced by the dead time Td becomes smaller than the ideal current.

Various countermeasures, so-called dead band compensation has been considered to prevent such an unpreferable influence of the dead time Td. Its basic idea is to compensate the distortion voltage ΔV represented by expression 4. Accordingly, a correction is performed by a correction voltage Δu represented by the following expression 5 to compensate expression 4.

$$\Delta u = \text{sign}(Is) \cdot (Ttot/Ts) \cdot (Vdc/2) \quad \text{[Expression 5]}$$

Here, it is a problem that polarity sign(Is) of the current Is can not be correctly detected. When the polarity of the current Is is measured, it is difficult to correctly measure the polarity of the current Is by noises of the PWM control and the above zero clamping phenomenon of the current.

In many conventional dead band compensations (e.g. disclosed in literature 1 (Ben-Brahim, The analysis and compensation of dead-time effects in the three phase PWM inverters, Proceedings of the IEEE-IECON98, Volume 2, pages 792-797)), methods are complicated and the addition of hardware is required. Further, no countermeasure considering a change of a load current such as the motor current, etc. is taken.

Therefore, the dead band compensation for preventing the up-and-down arm short circuit of the inverter causes distortions of the motor voltage and current or the output deficiency of torque and the increase of the torque ripple. An improvement countermeasure of this dead band compensation is conventionally complicated, and the addition of hardware is caused. Further, this compensation is imperfect dead band compensation in which no influence of the motor load current is considered.

The present invention is made from the above situations, and its object is to provide a controller of an electric power steering apparatus in which distortions of motor voltage and current and torque ripple are small by using dead band compensation having a simple construction and also considering influence of motor load current.

DISCLOSURE OF THE INVENTION

The present invention relates to a controller of an electric power steering apparatus for controlling a current of a motor giving a steering assist force to a steering mechanism by using an inverter, based on a current command value calculated on the basis of at least one steering torque signal generated in a steering shaft, and a voltage command value as an output of a current control circuit for setting at least said current command value to an input. The above object of the present invention is achieved by a construction in which said controller comprises a dead band compensating circuit in which a model current is generated based on said current command value, and a dead band compensation of said inverter is performed based on said model current. The above object of the present invention is also achieved by a construction in which an output value of said dead band compensating circuit is an adding value of a fixing value and a change value which is proportional to said model current.

Further, the above object of the present invention is achieved by a construction in which an output value of said dead band compensating circuit is a second change value proportional to said model current when said output value is a fixing value or less, and said output value is an adding value of said fixing value and a change value which is proportional to said model current when said output value is said fixing value or more. Further, the above object of the present invention is achieved by a construction in which said fixing value is a value determined from the characteristics of switching element constituting said inverter. Further, the above object of the present invention is achieved by a construction in which said model current is an output value of a reference model circuit for setting said current command value to an input value and constructed by a first order lag function. Further, the above object of the present invention is achieved by a construction in which a hysteresis characteristic circuit is arranged in the input of said dead band compensating circuit. Further, the above object of the present invention is achieved by a construction in which a hysteresis width of said hysteresis characteristic circuit is calculated based on the rotating speed of said motor or said current command value.

BRIEF DESCRIPTION OF THE DRAWINGS

FIG. 10 is a view showing a detailed construction within the dead band compensation of embodiment 2.

FIG. 11 is a view showing characteristics of compensation value of the dead band compensation of embodiment 2.

BEST MODE FOR CARRYING OUT THE INVENTION

The present invention has a construction in which a model current Imod is generated from a current command value, and a polarity sign(Imod) of current and a amount of a distortion voltage ΔV are estimated on the basis of the model current, and a dead band compensation is performed by calculating a compensation value provided by adding polarity to the amount of the distortion voltage ΔV. An important feature of the present invention is that the actually measured motor current of which the above polarity is difficult to be correctly measured is not utilized by utilizing the model current.

Embodiment 1

Preferred embodiment 1 of the present invention will next be explained in detail on the basis of the drawings.

Figure 1:
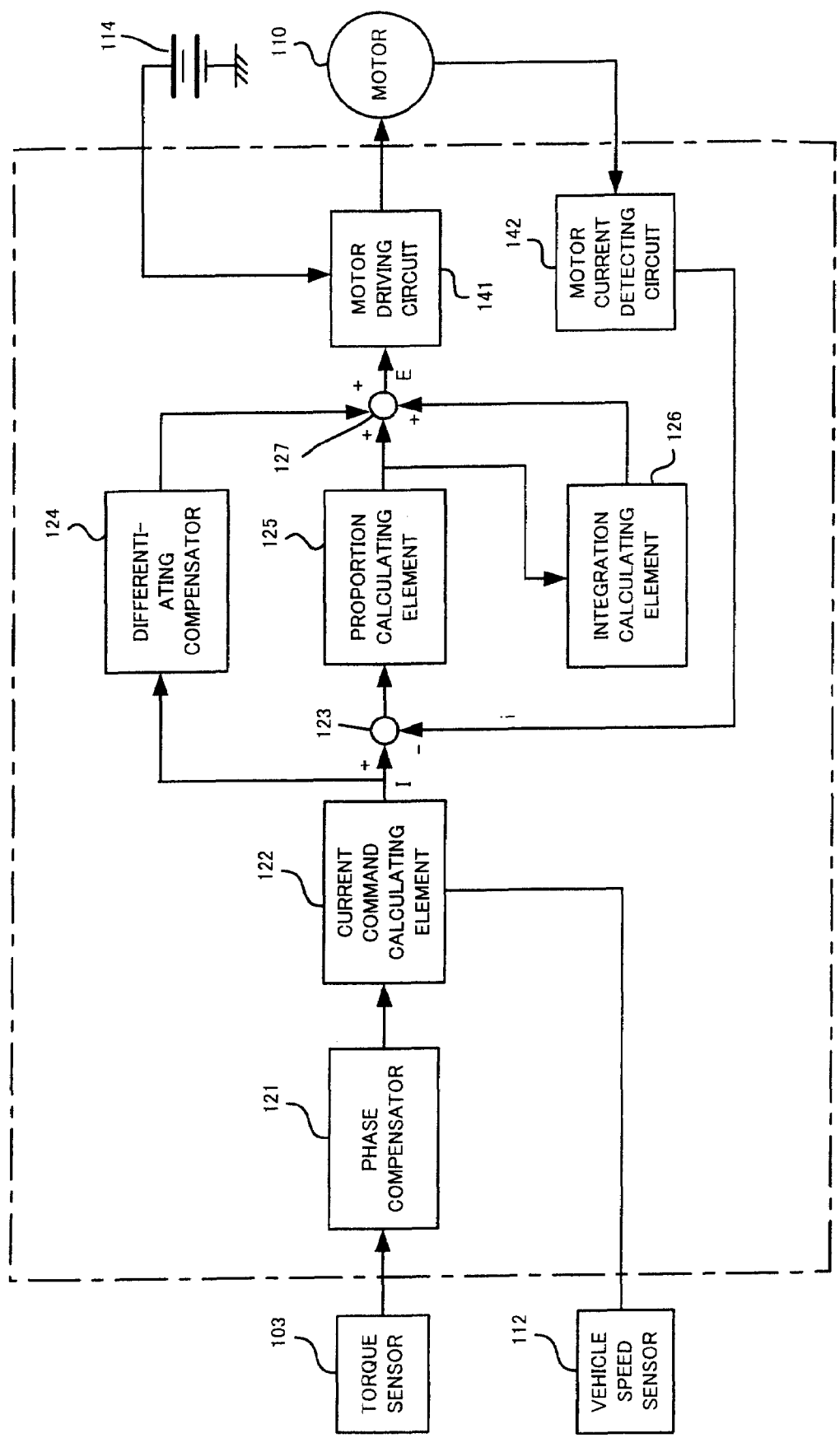
FIG. 1 is a view showing control construction of an electric power steering apparatus.
Figure 2:
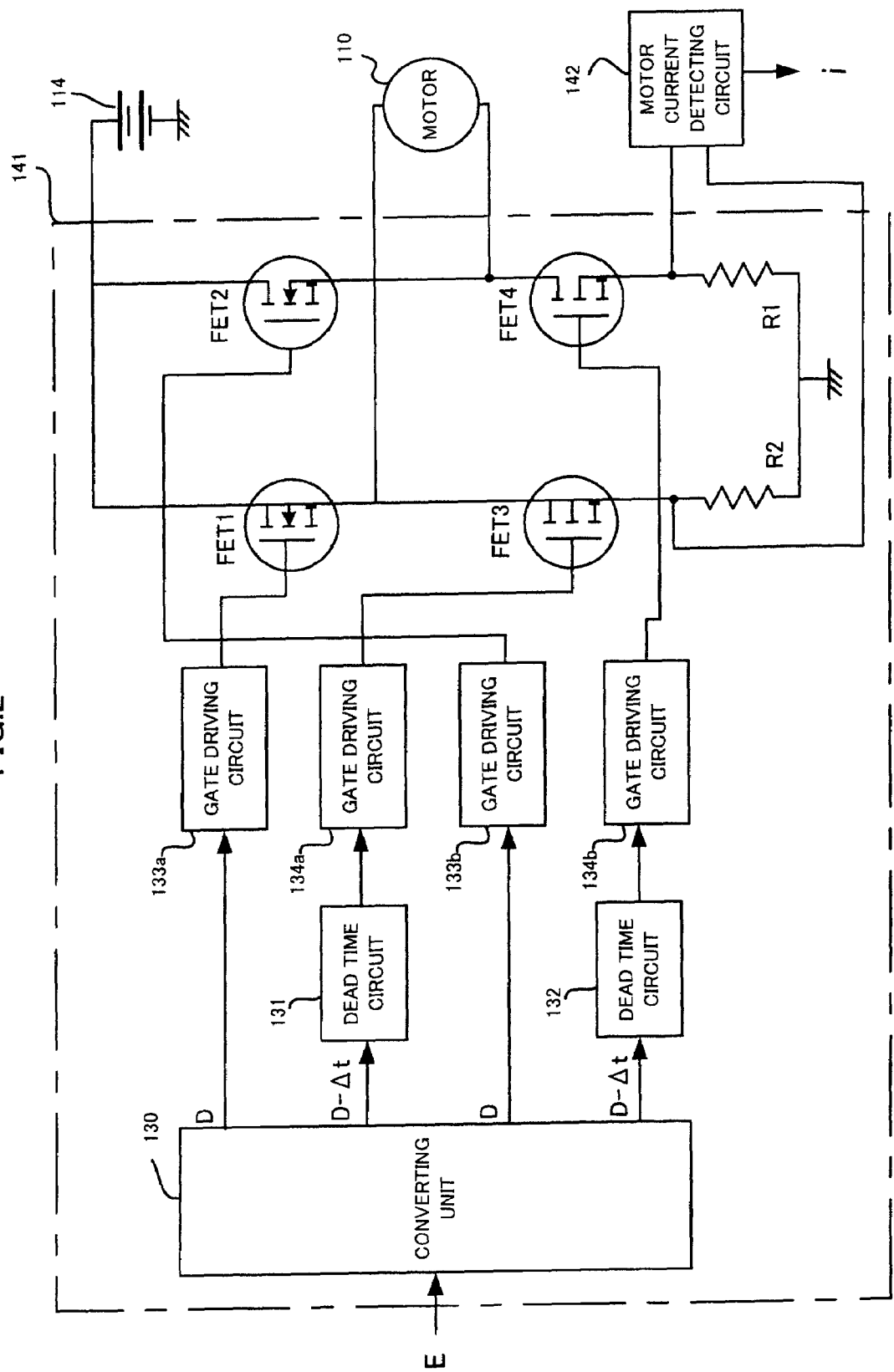
FIG. 2 is a view showing construction of a gate circuit considering a dead time of an inverter of the electric power steering apparatus.
Figure 3:
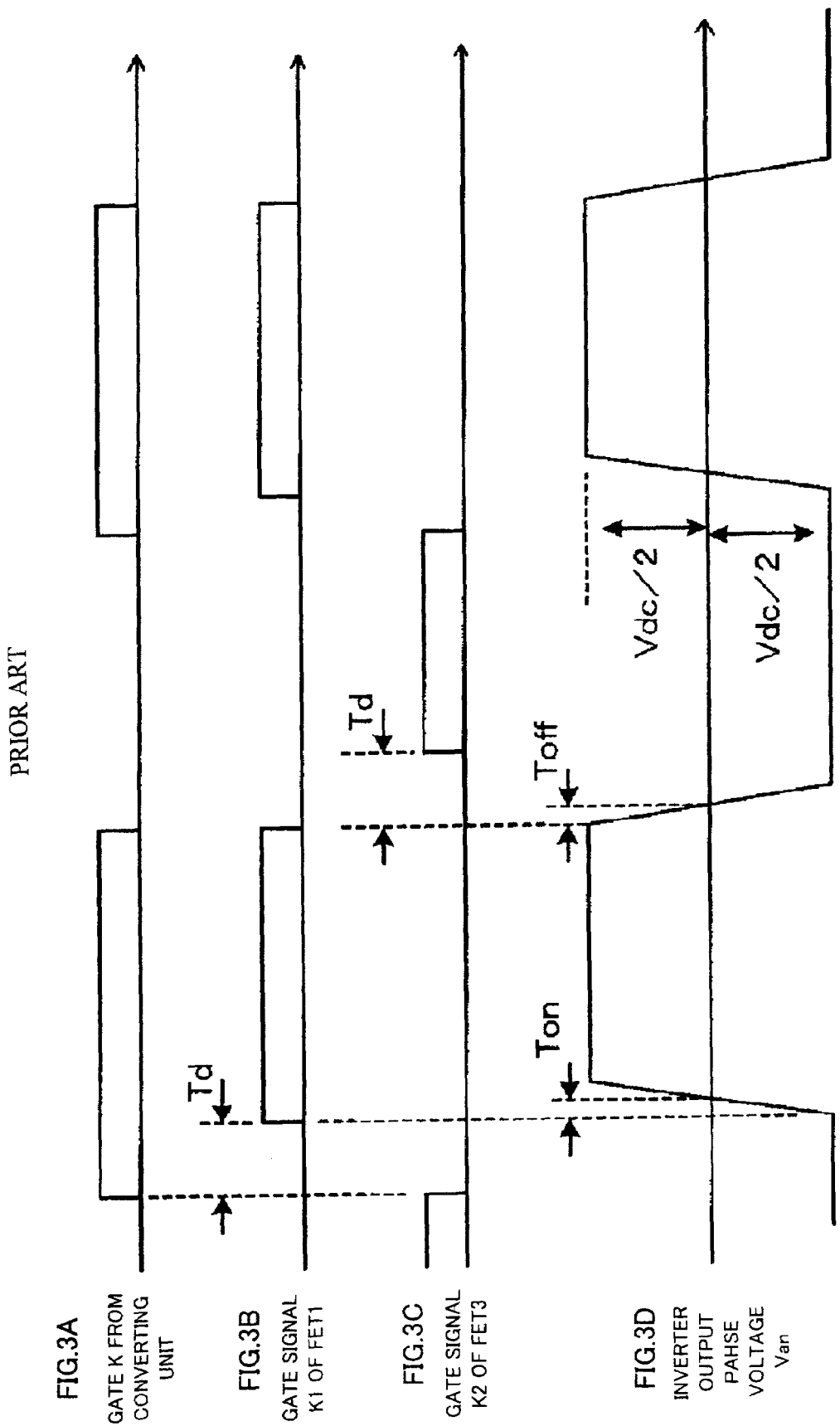
FIGS. 3A to 3D are views showing the relation of dead time, turn-on time and turn-off time in switching of inverter.
Figure 4:
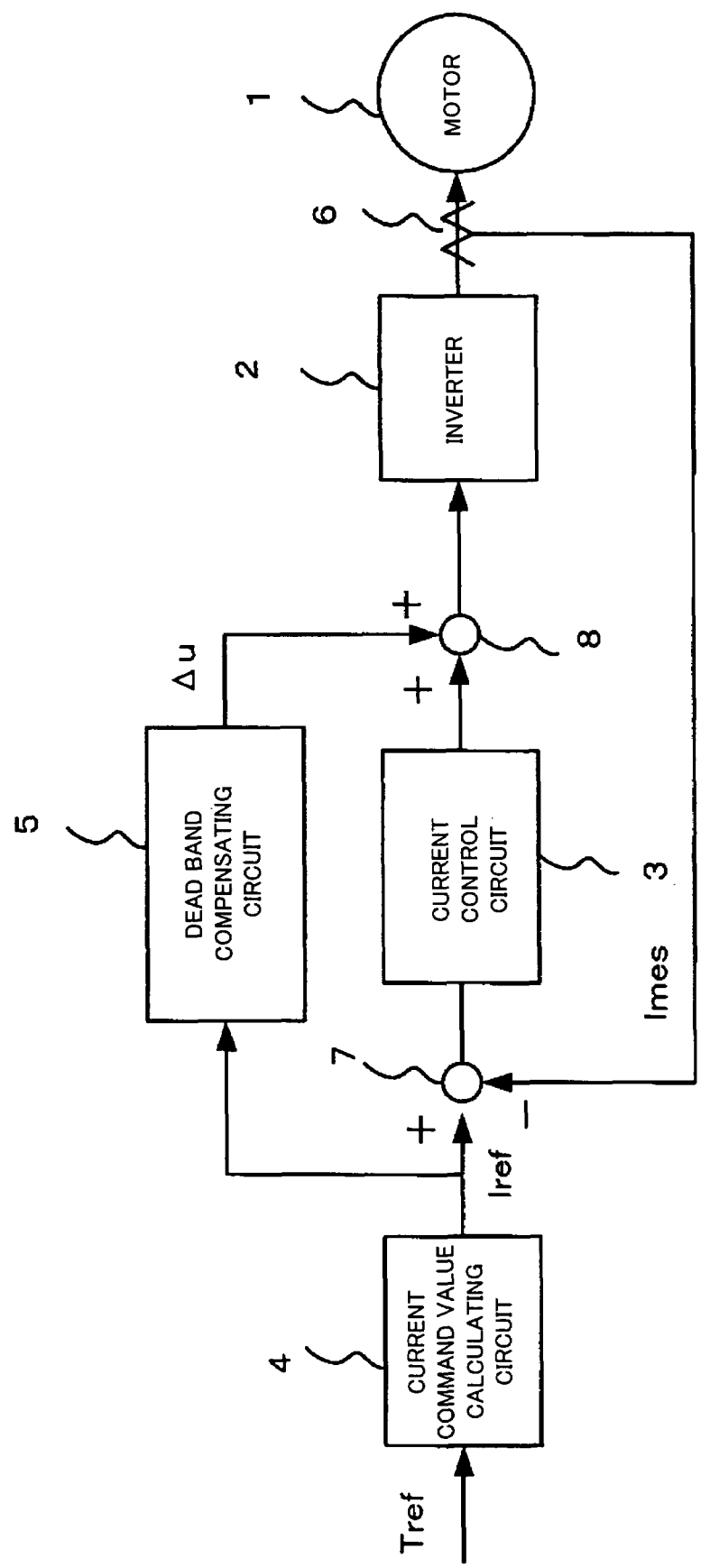
FIG. 4 is a view showing a basic control system of the electric power steering apparatus comprising dead band compensation according to the present invention.

FIG. 4 shows the basic construction of the controller of the electric power steering apparatus. In a current command value calculating circuit 4, a current command value Iref is calculated on the basis of a steering torque signal Tref generated in a steering shaft. On the other hand, a current Imes of a motor 1 is detected by a current detector 6, and is fed back to a subtracting circuit 7. The error between the above current command value Iref and the motor current I is calculated and inputted to a current control circuit 3, and a voltage command value u is calculated. Then, an inverter 2 is PWM-controlled on the basis of the voltage command value u. The inverter 2 may be set to a single phase inverter constructed two up-and-down arms as shown in FIG. 2, and may be also set to a three-phase inverter constructed by three up-and-down arms.

A dead band compensating circuit 5 of the present invention is added to the above basic control construction. Namely, in the dead band compensating circuit 5, the current command value Iref is set to an input, and a compensation value Δu is calculated and added to the voltage command value u as an output of the current control circuit 3 by an adding circuit 8.

Figure 5:
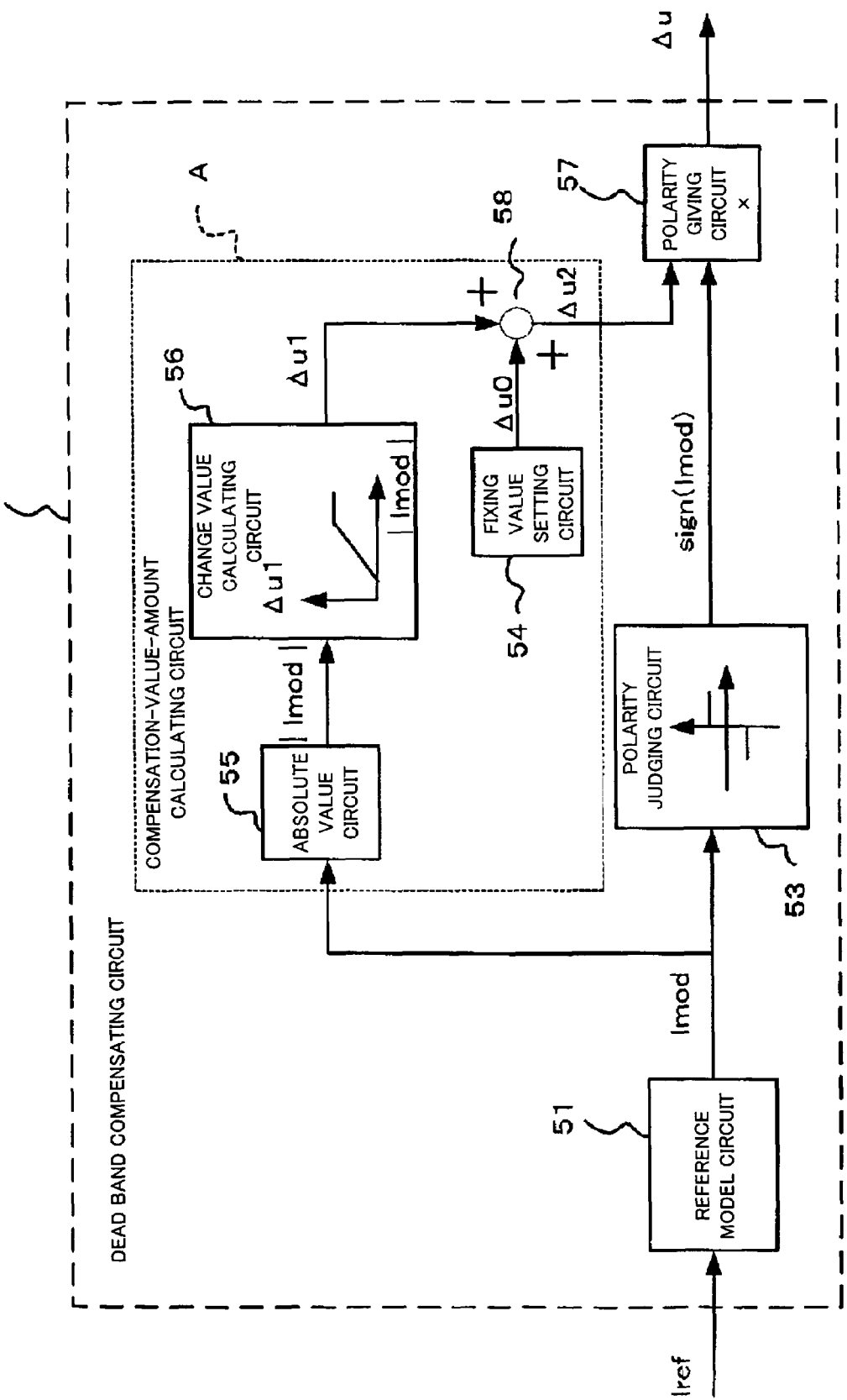
FIG. 5 is a view showing a detailed construction within the dead band compensation of embodiment 1.

Next, FIG. 5 shows the details of the dead band compensating circuit 5. First, the construction of the dead band compensating circuit 5 will be explained, and its operation will be then explained.

The current command value Iref as the input of the dead band compensating circuit 5 is inputted to a reference model circuit 51, and a model current Imod is outputted. The first feature of the present invention is that the dead band compensation is performed by this model current Imod instead of the actually measured current of the motor.

A compensation value Δu is constructed by the polarity of the compensation value Δu and the amount of the compensation value Δu (hereinafter noted as a compensation-value-amount Δu2).

First, the polarity of the compensation value Δu is calculated. The model current Imod as the output of the reference model circuit 51 is inputted to a polarity judging circuit 53, and its polarity is judged. Sign(Imod) as the output of the polarity judging circuit 53 is outputted in the form of (+1) or (−1).

Next, the amount of the compensation value Δu, i.e., the compensation-value-amount Δu2 is calculated. The model current Imod outputted in the reference model circuit 51 is also used to calculate the compensation-value-amount Δu2. First, the model current Imod is inputted to an absolute value circuit 55, and |Imod| as the output of the absolute value circuit 55 is inputted to a change value calculating circuit 56, and a change value Δu1 is calculated. The second feature of the present invention is that the dead band compensation considering this change value Δu1, i.e., the dead band compensation considering the change of the motor current due to a motor load change is performed.

Then, a fixing value Δu0 set by a fixing value setting circuit 54 and the change value Δu1 are added by an adding circuit 58, and its output (Δu0+Δu1) corresponds to the compensation-value-amount Δu2. A compensation-value-amount calculating circuit corresponds to a portion surrounded by a dotted line A of FIG. 5, and is constructed by the absolute value circuit 55, the change value calculating circuit 56, the fixing value setting circuit 54 and the adding circuit 58. The model current Imod is inputted to the compensation-value-amount calculating circuit, and the compensation-value-amount is outputted as its output.

Finally, sign(Imod) as the output of the polarity judging circuit 53 and the compensation-value-amount Δu2=(Δu0+Δu1) are inputted to a multiplying circuit 57 as one example of a polarity giving circuit, and the compensation value Δu having the polarity is calculated as its output. The basic construction of the dead band compensating circuit 5 is provided as mentioned above. The operation of each circuit will next be explained in detail.

First, the reference model circuit 51 inputs the current command value Iref thereto and calculates the model current Imod. Here, a transfer function of the reference model circuit 51 is represented by the following expression 6.

$$MR(s)=1/(1+Tc \cdot s) \qquad \text{[Expression 6]}$$

Here, $Tc=1/(2\pi \cdot fc)$ is set, and fc is a cutoff frequency of a current control loop.

This first order lag function is a model function of the current control loop in which $1/(R+s \cdot L)$ as a function representing the motor 1 of FIG. 4 is derived on the basis of the current control circuit 3, the inverter 2 and the current detecting circuit 6.

Figure 6:
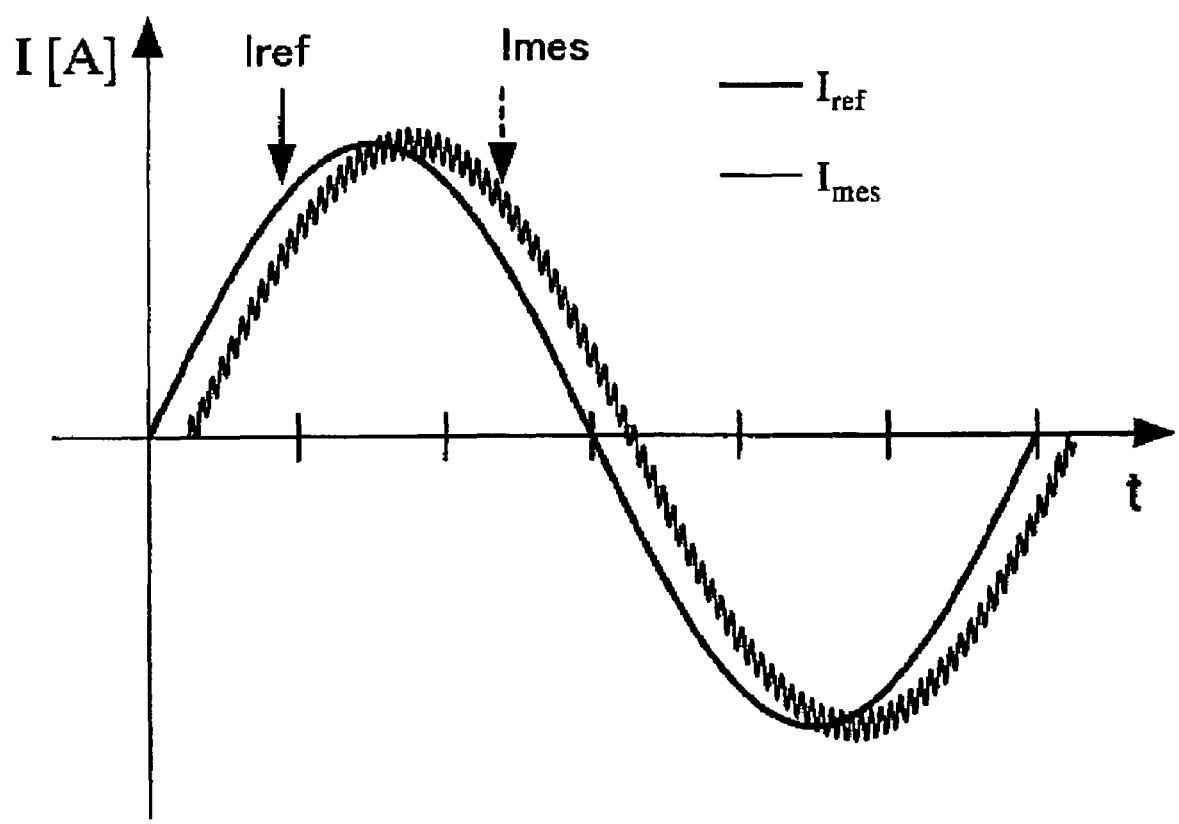
FIG. 6 is a view showing the relation of current command value Iref and actual motor current Imes.

Here, one example of the relation of the current command value Iref and the actual current Imes is shown in FIG. 6. The actual current Imes includes many noises, which makes a polarity judgment difficult near a zero current. Therefore, the motor current is generated through a first order lag circuit on the basis of the current command value Iref having no noises without using the actual current Imes.

Next, the polarity of the model current Imod is inputted to the polarity judging circuit 53, and sign(Imod) as the polarity of the model current Imod is calculated. As shown in expression 7, sign(Imod) has a value of one of (+1) and (−1). As mentioned above, it is very difficult to measure the actual motor current and the inverter current and correctly judge the polarity since there are noises, etc. However, if the judgment is made by using the model current as in the present invention, there is not such a fear.

$$\text{Sign}(I\text{mod})=(+1) \text{ or } (-1) \qquad \text{[Expression 7]}$$

Next, the compensation value calculating circuit, i.e., a portion for calculating the compensation-value-amount $\Delta u2$ as the amount of the compensation value $\Delta u$ from the model current Imod will be explained. First, the model current Imod is inputted to the absolute value circuit 55, and |Imod| is outputted. The absolute value is calculated to first unify the polarity since the amount of the compensation value is calculated.

Next, the output |Imod| of the absolute value circuit 55 is inputted to the change value calculating circuit 56, and a change value $\Delta u1$ is calculated. Here, the relation of the input and output of the change value calculating circuit 56 is represented by following expression 8.

$$\Delta u1 = \text{Req} \cdot |(I\text{mod} - Ic)| \qquad \text{[Expression 8]}$$

Here, Req represents equivalent resistance. In this case, Imod>Ic is set. In the case of Ic>Imod>0, $\Delta u1=0$ is set. Namely, no compensation of the change value $\Delta u1$ is performed when the model current Imod is a small value. In actual phenomenon, the change value hits the peak with respect to an increase of the current.

Here, it is important that the change value $\Delta u1$ represented by expression 8 is changed in proportion to the model current Imod. Namely, an important point is that the change value $\Delta u1$ considering the change of the motor current due to the change of a motor load is assembled into the compensation value $\Delta u$. This point is not considered in the conventional dead band compensation.

On the other hand, a fixing value $\Delta u0$ is set in the fixing value setting circuit 54. This fixing value $\Delta u0$ shows the value of the following expression 9.

$$\Delta u0 = (T\text{tot}/T s) \cdot (Vdc/2) \qquad \text{[Expression 9]}$$

Here, as shown in expression 1, the total lag time Ttot is set to Ttot=Td+Ton−Toff. The dead time Td, the turn-on time Ton and the turn-off time Toff are values determined by the kind of a switching element used in the inverter, etc. For example, in the case of the FET, there are also characteristics in which the turn-on time Ton and the turn-off time Toff are increased as a rated voltage and a rated current are increased. Namely, in the element of the FET used in the inverter of large capacity, the turn-on time Ton and the turn-off time Toff tend to be increased. Further, when the turn-on time Ton and the turn-off time Toff are increased, the dead time Td is also increased so as not to generate the short circuit of a up-and-down arm. Vdc is determined by a battery voltage.

As explained above, the fixing value $\Delta u0$ is a value determined by the inverter used in the electric power steering apparatus.

Next, the change value $\Delta u1$ and the fixing value $\Delta u0$ are added by the adding circuit 58 as shown in expression 10, and the compensation-value-amount $\Delta u2$ is calculated.

$$\Delta u2 = (\Delta u0 + \Delta u1) \qquad \text{[Expression 10]}$$

The expression 10 means that the fixing value $\Delta u0$ determined by the kind of the inverter is set to a reference and the compensation-value-amount $\Delta u2$ is adjusted by the change value $\Delta u1$ provided by adding the influence of the motor current to this fixing value $\Delta u0$.

Finally, the polarity is given to the compensation-value-amount $\Delta u2$, and the compensation value $\Delta u$ is calculated. Specifically, as shown in the following expression 11, sign (Imod) as the output of the polarity judging circuit 53 and $(\Delta u0+\Delta u1)$ representing the compensation-value-amount are multiplied by the multiplying circuit 57 as one example of the polarity giving circuit.

$$\Delta u = \text{sign}(I\text{mod}) \cdot \Delta u2 = \text{sign}(I\text{mod}) \cdot (\Delta u0 + \Delta u1) \qquad \text{[Expression 11]}$$

Figure 7:
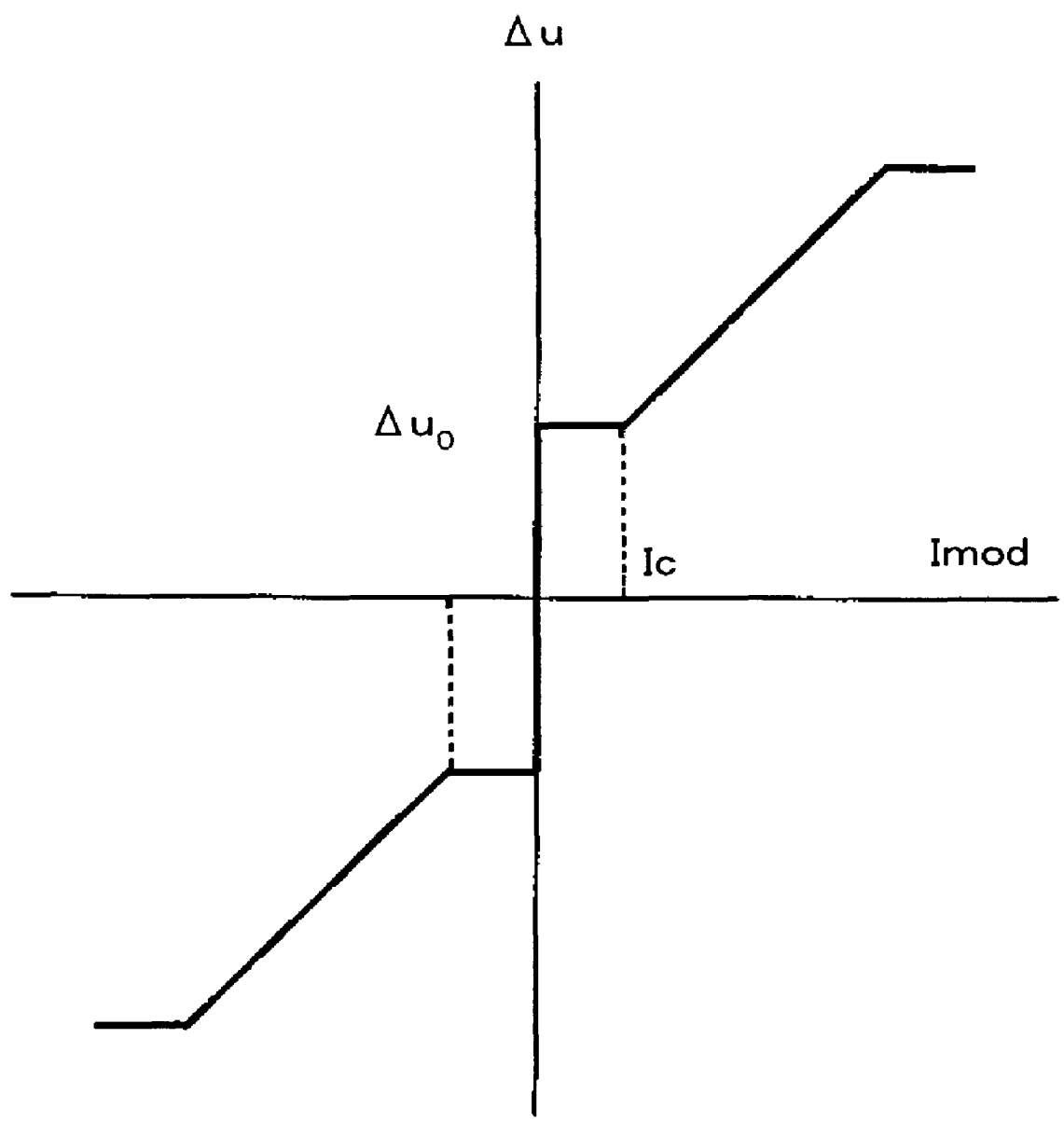
FIG. 7 is a view showing characteristics of compensation value of the dead band compensation of embodiment 1.

Here, sign(Imod) is (+1) or (−1) as a value. Accordingly, the compensation value $\Delta u$ has a value of $(\Delta u0+\Delta u1)$ or $-(\Delta u0+\Delta u1)$. This compensation value $\Delta u$ is provided as shown in FIG. 7.

The compensation value $\Delta u$ calculated in this way is added to the voltage command value u as the output of the current control circuit 3 shown in FIG. 4 by the adding circuit 8. The additional calculation of the compensation value $\Delta u$ with respect to the voltage command value u means that the compensation value $\Delta u$ for improving voltage and current distortions and a torque ripple due to the dead time for preventing the short circuit of the up-and-down arm is added to the basic control shown by the voltage command value u, and the control is performed.

If this embodiment is employed, the model current is used. Accordingly, it is possible to realize the dead band compensation for preventing that the distortions of the motor voltage and current are generated and the torque ripple is increased by a simple control circuit construction without using the polarity judgment of the actually measured current having many noises and often judged in error.

Figure 8:
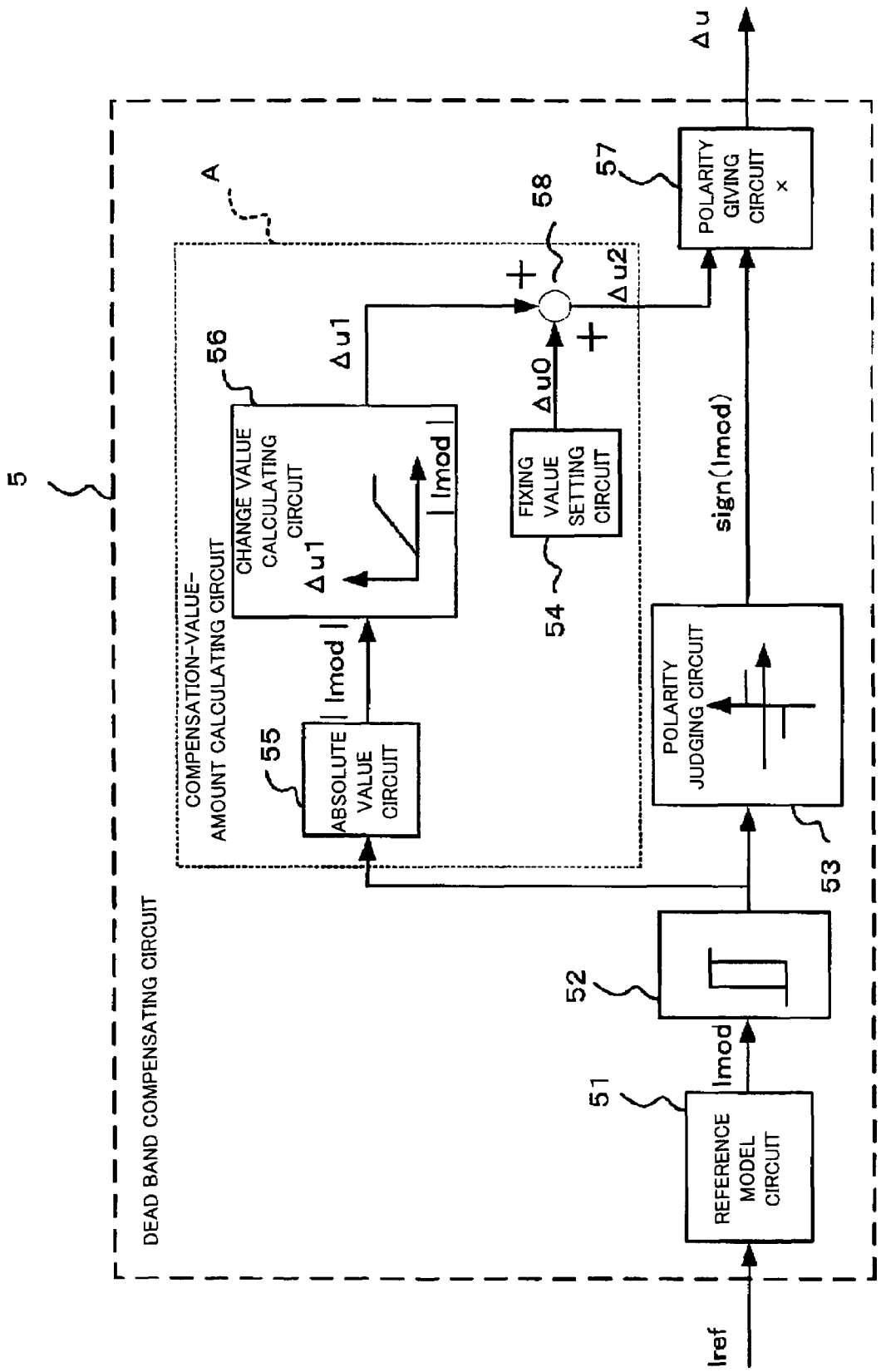
FIG. 8 is a view showing a detailed construction within the dead band compensation as a modified example of embodiment 1.
Figure 9:
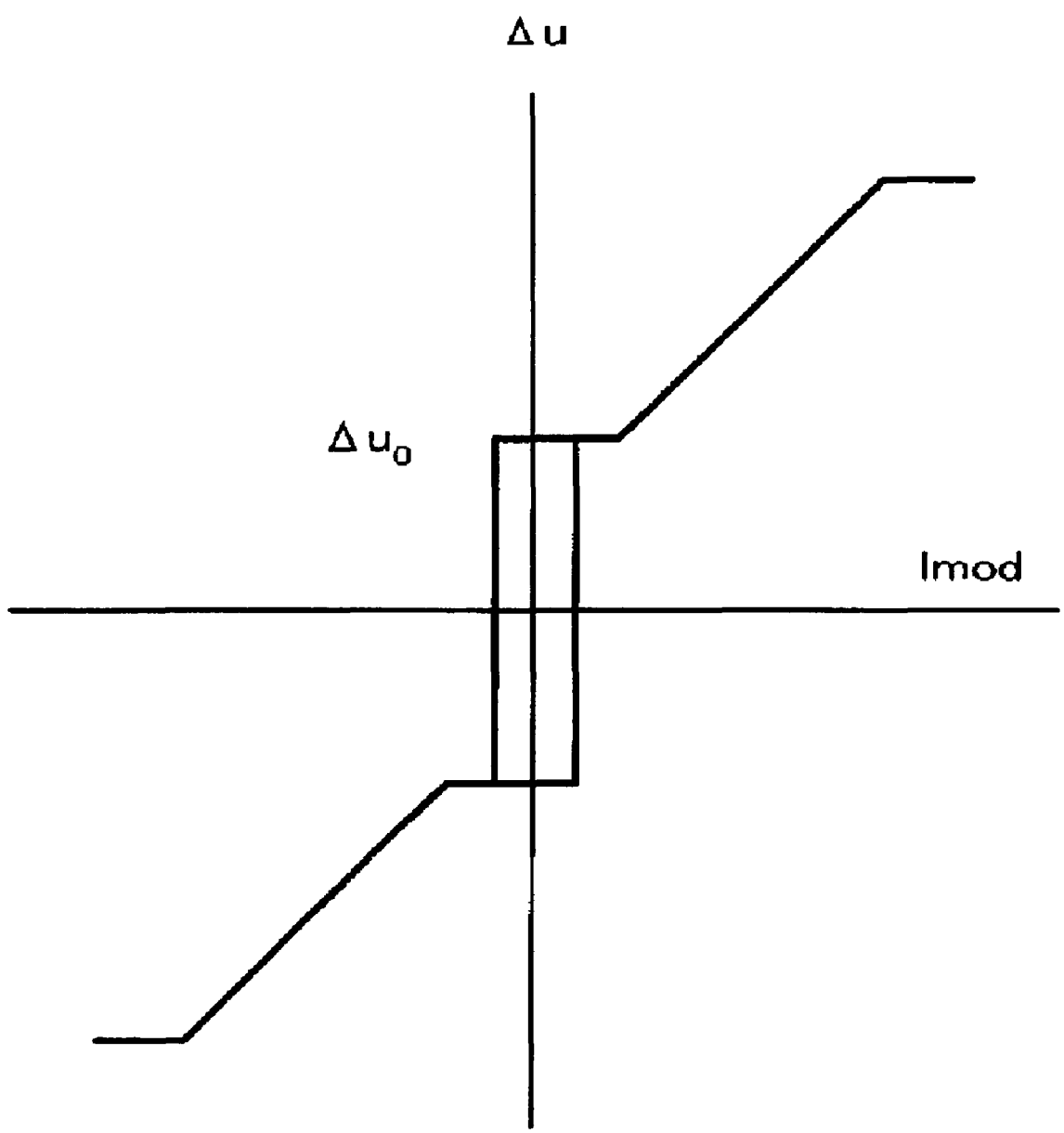
FIG. 9 is a view showing characteristics of compensation value of the dead band compensation of the modified example of embodiment 1.

FIG. 8 shows a modified example of embodiment 1. This modified example shows an embodiment in which a hysteresis circuit 52 is added to the output of the reference model circuit 51. In this modified example, when the load current passes through a zero point, it is prevented that the polarity becomes unstable (chattering of the compensation value), and stable control can be performed. An improvement is performed with respect to these points in this modified example. FIG. 9 shows the compensation value $\Delta u$ considering the hysteresis circuit 52. Since noises are few in the model current, the hysteresis width can be reduced in comparison with a case using the actual motor current. Accordingly, more accurate dead band compensation can be performed.

In this embodiment, the calculation is performed by separating the polarity sign (Imod) and the amount $\Delta u2$ of the compensation value as a procedure for calculating the compensation value $\Delta u$. However, the same effects are naturally obtained even when the compensation value $\Delta u$ is calculated without performing the separation.

Embodiment 2

In the embodiment 1 explained above, when the hysteresis circuit 52 is arranged and when no hysteresis circuit 52 is arranged, there is a portion suddenly changed from the fixing value $-\Delta u0$ to the fixing value $\Delta u0$, or a portion suddenly changed from the fixing value $\Delta u0$ to the fixing value $-\Delta u0$ in the vicinity in which the model current Imod is 0[A]. When the value of the fixing value $\Delta u0$ is small, this sudden change does not give a feeling of physical disorder to the feeling of a handle operation. However, when the value of the fixing value $\Delta u0$ is large, a problem exists in that the feeling of the handle operation becomes worse by this sudden change. It is considered that the value of the fixing value $\Delta u0$ becomes large in a case mainly using the FET of large capacity, etc. for a large-sized vehicle, etc.

Therefore, to solve this problem, characteristics of a second change value proportional to the model current Imod are provided instead of the fixing value $\Delta u0$ even in a small area (the fixing value Δu0 or less) of the model current Imod. The dead band compensation similar to that of embodiment 1 is performed on the basis of (Δu0+Δu1) as the compensation value Δu provided by adding the change value Δu1 proportional to the model current Imod and the fixing value Δu0 similarly to embodiment 1 when reaching the fixing value Δu0.

FIG. 10 shows the details of the dead band compensating circuit 5 based on this idea. FIG. 11 shows the characteristics of the compensation value of this dead band compensation. The dead band compensating circuit in FIG. 10 differs from the dead band compensating circuit of embodiment 1 in a portion of the fixing value setting circuit 54. In embodiment 2, a second change value calculating circuit 60 for calculating a second change value Δu3 is arranged instead of the fixing value setting circuit 54. The second change value calculating circuit 60 calculates the second change value Δu3 proportional to the model current Imod, and has an insensitivity band in the model current Imod near 0[A]. The inclination of a change of the second change value Δu3 and the magnitude of the insensitivity band are determined by the kind of the FET, the feeling of the handle operation, etc. every specific device. The constructions and operations of other portions of the dead band compensating circuit 5 are the same as embodiment 1.

FIG. 11 shows dead band compensation characteristics generated by the dead band compensating circuit 5 of embodiment 2. In the features of these characteristics, chattering is prevented by the insensitivity band of the second change value calculating circuit 60, and a sudden change from the fixing value Δu0 to the fixing value −Δu0 can be prevented by the second change value Δu3. As its result, in embodiment 2, there is an effect able to prevent the worsening of the feeling of the handle operation which is a problem in embodiment 1.

FIGS. 12A, 12B and 13A, 13B show simulation results using the dead band compensation of the present invention.

Figure 12A:
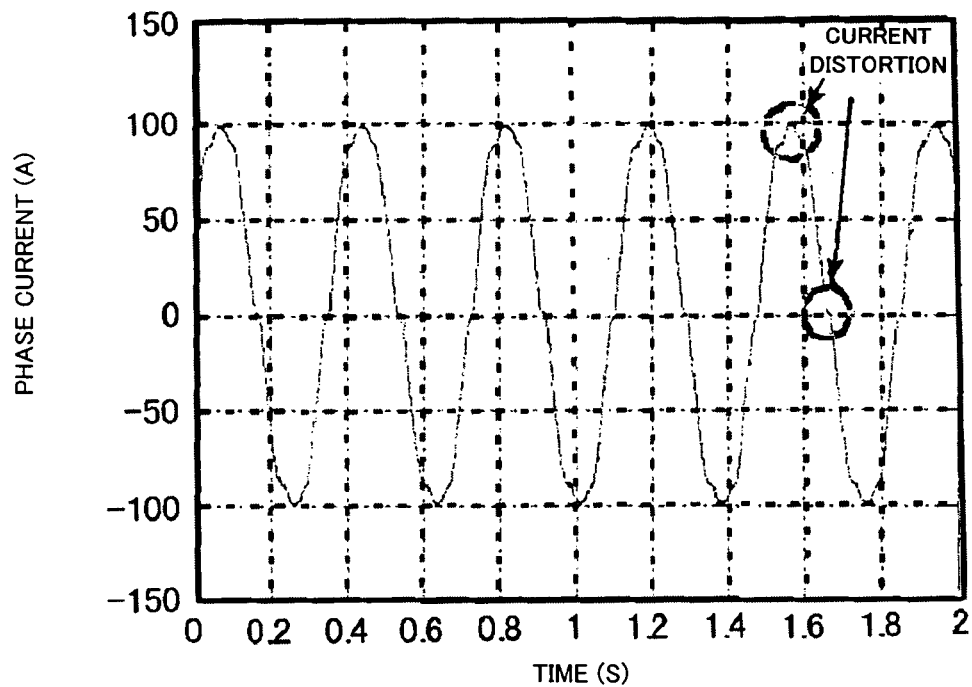
FIG. 12 is a view showing a simulation result in which the present invention is applied to a sine wave motor.
Figure 12B:
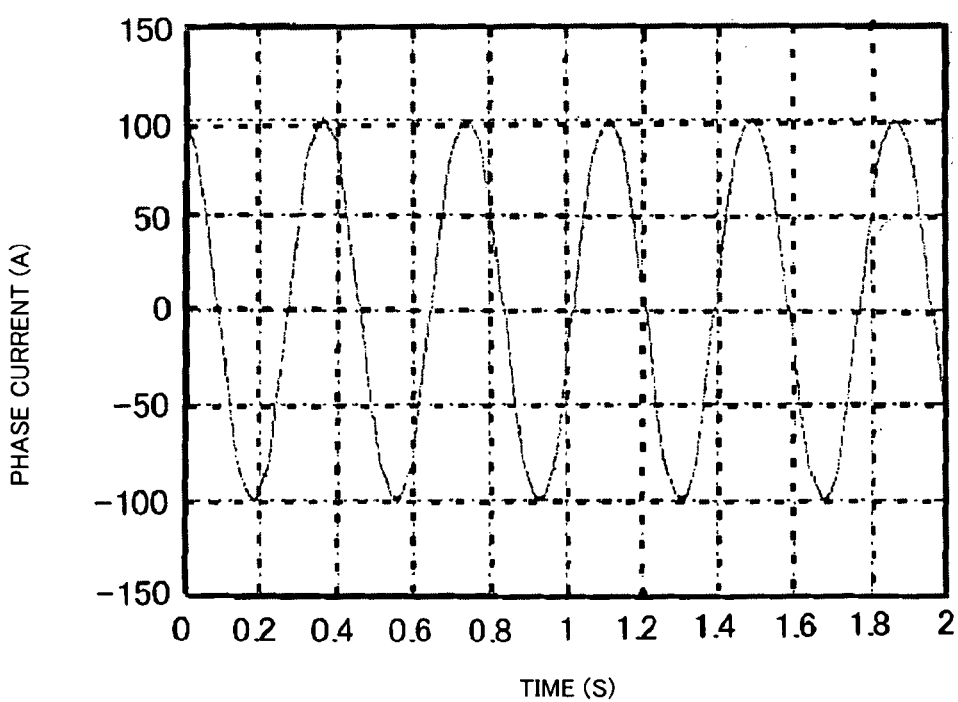

FIG. 12A shows a case in which no dead band compensation of the present invention is applied to a three-phase sine wave motor. FIG. 12B shows the result of the motor current of one phase amount when the dead band compensation is applied. As shown in FIG. 12A, when no dead band compensation is used, distortion is generated near a peak value of the motor current and a zero point. In contrast to this, when the dead band compensation of the present invention is performed as shown in FIG. 12B, no distortion of the current is almost seen in comparison with FIG. 12A.

Figure 13A:
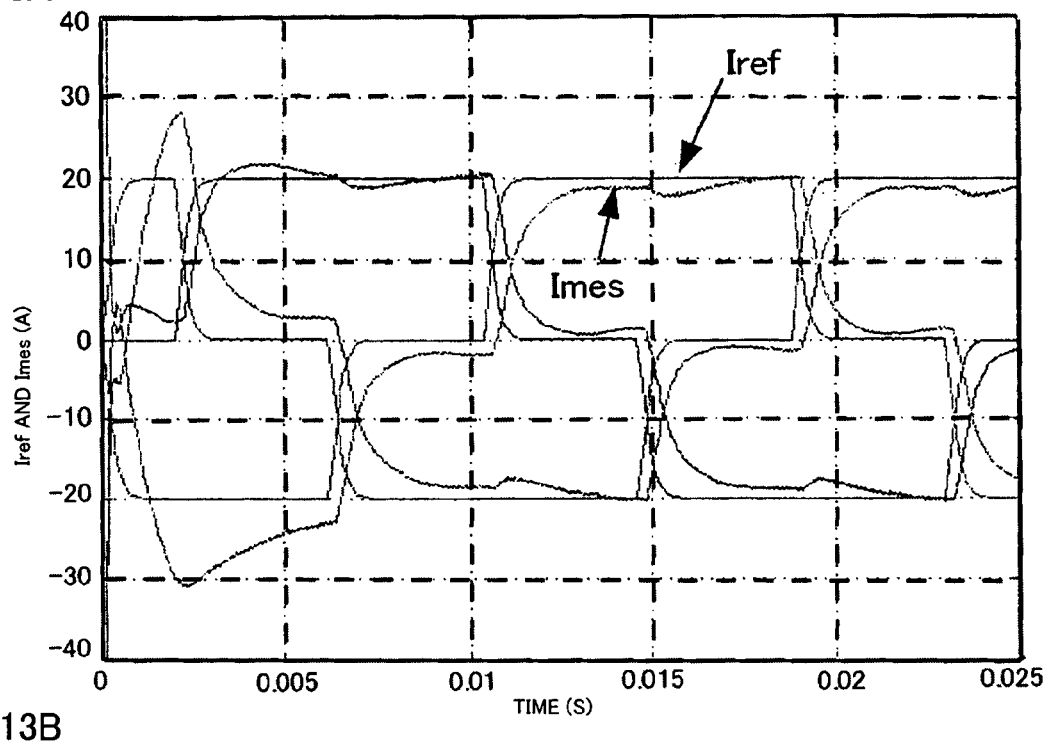
FIG. 13 is a view showing a simulation result in which the present invention is applied to a rectangular wave motor.
Figure 13B:
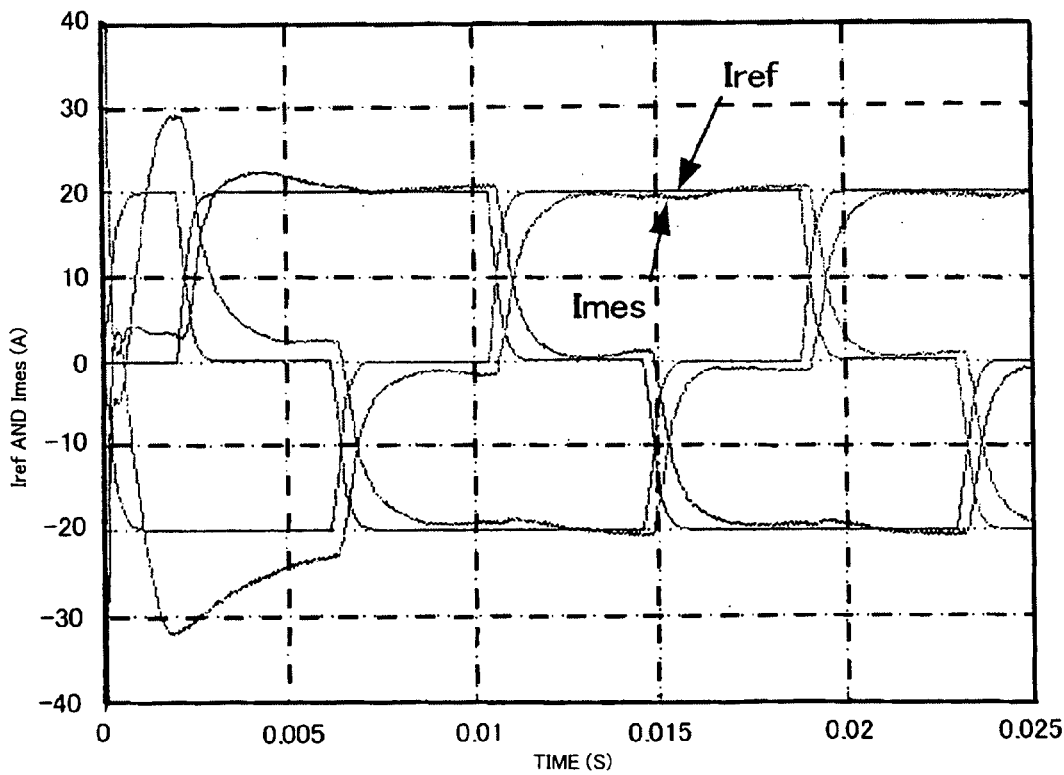

FIG. 13A shows a case in which no dead band compensation is applied to a three-phase rectangular wave motor. FIG. 13B shows a result of the motor current when the dead band compensation is applied. When no dead band compensation of FIG. 13A is performed, it is seen that the actual current Imes is considerably distorted with respect to the current command value Iref. When this distortion is seen in detail, the influence of the distortion near the zero current of a certain phase affects the distortion near a maximum current of another phase. In the simulation of the sine wave current motor as shown in FIG. 12A, distortion is generated near zero and the maximum current in the current waveform, but the same reason as the reason of this generation happened. When the maximum current of the motor current is distorted, a torque ripple of the motor is greatly generated. On the other hand, when the dead band compensation of FIG. 13B is performed, the actual current Imes becomes a value closer to the current command value Iref and the current distortion is clearly small. Namely, when the dead band compensation of the present invention is used, the distortion of the current is reduced and the torque ripple can be also restrained in the sine wave current motor and the rectangular wave current motor.

Embodiment 3

Next, an embodiment relating to an improvement of the hysteresis width of a hysteresis characteristic circuit will be explained. A problem exists in that the model current Imod cannot be formed as a perfect model of the actual motor current Imes, and there is an error between the model current Imod and the actual motor current Imes. This problem will be explained with reference to FIG. 11.

Figure 14A:
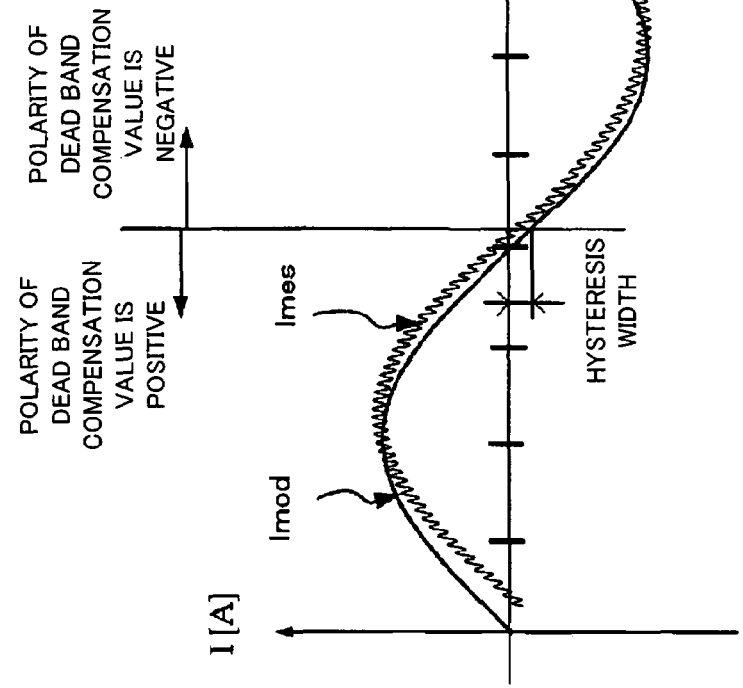
FIG. 14 is a view showing the relation of rotating speed of the motor, current command value and hysteresis width.
Figure 14B:
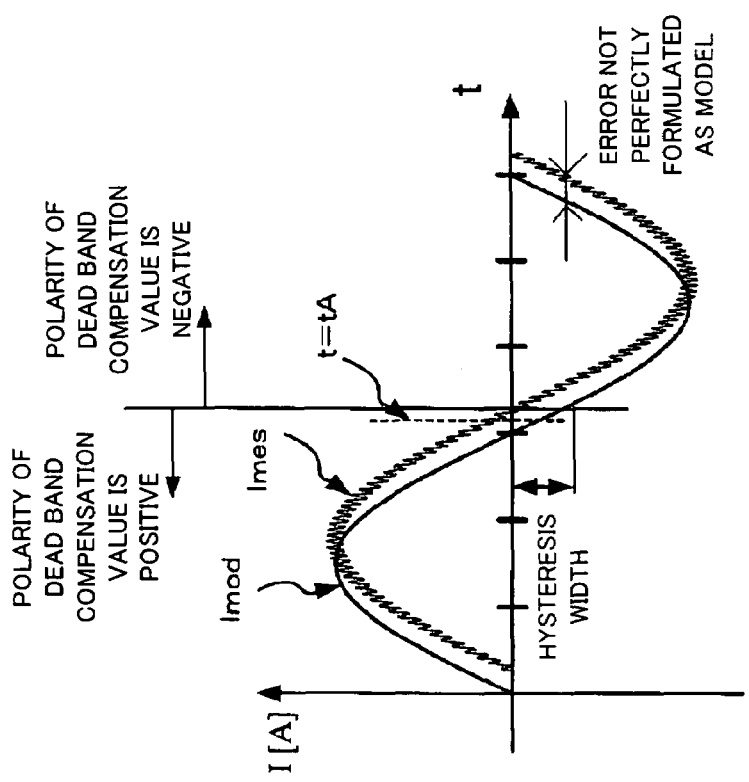

FIG. 14A shows the relation of the model current Imod and the actual motor current Imes when the current command value Iref is large and the rotating speed ω of the motor is fast. On the other hand, FIG. 14B shows the relation of the model current Imod and the actual motor current Imes when the current command value Iref is small and the rotating speed ω of the motor is slow.

When the polarity is judged by positiveness and negativeness of the model current Imod at t=tA of FIG. 14A, the actual motor current Imes yet has the positive polarity and the dead band compensation of the incorrect polarity is performed although the polarity of the model current Imod is already changed from positiveness to negativeness. The hysteresis is arranged to prevent this error. However, when the relation of the model current Imod and the actual motor current Imes of FIG. 14A and the relation of the model current Imod and the actual motor current Imes of FIG. 14B are compared, the error is increased as the current command value Iref is large and the rotating speed ω of the motor is fast. Namely, with respect to the hysteresis width, it is necessary to determine the hysteresis width considering the current command value Iref or the rotating speed ω of the motor.

Figure 15:
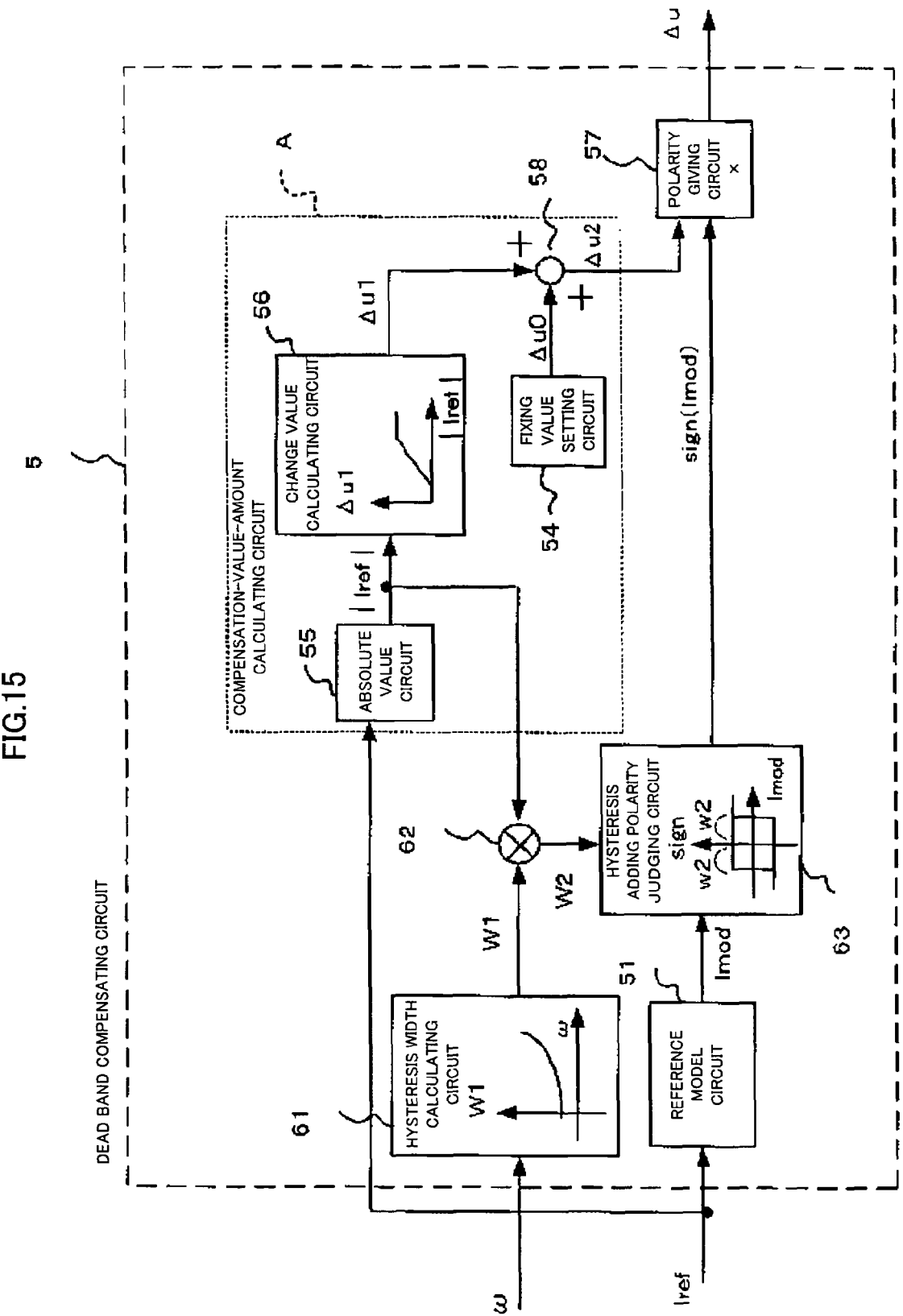
FIG. 15 is a view showing characteristics of compensation value of the dead band compensation of embodiment 3.

An embodiment for improving such a problem will be explained with reference to FIG. 15. The embodiment of FIG. 15 is an embodiment in which the model current Imod is used in only the polarity judgment. This embodiment is also an embodiment for calculating the hysteresis width by considering both the current command value Iref and the motor rotating speed ω. In its construction, the rotating speed ω of the motor is inputted to a hysteresis width calculating circuit 61, and a hysteresis width W1 as a reference is first determined. On the other hand, the current command value Iref is inputted to the absolute value circuit 55, and the magnitude |Iref| of the current command value is calculated. A hysteresis width W2 also considering the magnitude |Iref| of the current command value Iref is then calculated as W2=|Iref|×W1 by a multiplier 62. Polarity sign(Imod) is then calculated and outputted in a hysteresis adding polarity judging circuit 63 to which the calculated hysteresis width W2 is inputted.

Here, the operation of the hysteresis adding polarity judging circuit 63 will be explained. When the model current Imod is greater than the hysteresis width W2, "+1" is calculated as the polarity sign(Imod). Conversely, when the model current Imod is smaller than the hysteresis width −W2, "−1" is calculated as the polarity sign(Imod). When the model current Imod is greater than the hysteresis width −W2 and is smaller than the hysteresis width +W2, the previous polarity sign(Imod) is used.

Thus, the error in the detection of the polarity judgment due to an error in the model formation of the model current Imod and the actual motor current Imes can be prevented by determining the hysteresis width W2 on the basis of the current command value Iref and the rotating speed ω of the motor in the polarity judgment. In this embodiment, the hysteresis width W2 is calculated by using both the current command value Iref and the rotating speed ω of the motor, but may be also calculated on the basis of one of the current command value Iref and the rotating speed ω of the motor. Further, a table may be used when the hysteresis width W1 is determined from the rotating speed ω of the motor. A table may be also used to calculate only the absolute value |Iref| from the current command value Iref. In this embodiment, the calculation of the absolute value is used as it is to reduce a calculating amount without passing through the table.

As explained above, the incorrect detection of the polarity judgment due to the error in the model formation can be prevented by determining the hysteresis width for the polarity judgment on the basis of the current command value or the rotating speed of the motor. Thus, effective dead band compensation can be performed.

As explained above, if the present invention is used, the model current is used. Accordingly, it is not necessary to actually measure the motor current difficult to judge the polarity. Further, the dead band compensation also considering a change of the motor current is performed. Accordingly, it is possible to provide an electric power steering apparatus small in the distortions of the motor voltage and current and also small in the torque ripple while the short circuit of the up-and-down arm of the inverter is reliably prevented. Further, it is also an advantageous effect of the present invention that it is not necessary to newly add hardware so as to apply the present invention.

In accordance with the controller of the electric power steering apparatus of the present invention, the dead band compensation is performed on the basis of the model current from the current command value. Accordingly, differing from the conventional dead band compensation based on the actually measured current including noises, it is possible to provide a controller of the electric power steering apparatus able to perform the dead band compensation small in the distortions of the motor voltage and current or small in the torque ripple.

Further, the dead band compensation also considering the change of the motor current due to the change of a motor load is performed by using the model current. Accordingly, differing from the dead band compensation using only the fixing value as in the conventional case, it is possible to provide a controller of the electric power steering apparatus able to perform the dead band compensation small in the distortions of the motor voltage and current or small in the torque ripple.

INDUSTRIAL APPLICABILITY

In the controller of the electric power steering apparatus of the present invention, the dead band compensation is performed on the basis of the model current from the current command value. Accordingly, differing from the conventional dead band compensation based on the actually measured current including noises, it is possible to perform the dead band compensation small in the distortions of the motor voltage and current or small in the torque ripple.

What is claimed is:

1. A controller of an electric power steering apparatus for controlling a current of a motor giving a steering assist force to a steering mechanism by using an inverter, based on a current command value calculated on the basis of at least one steering torque signal generated in a steering shaft, and a voltage command value as an output of a current control circuit for setting at least said current command value to an input, characterized in that:
   said controller comprises a dead band compensating circuit in which a model current is generated based on said current command value, and a dead band compensation of said inverter is performed based on said model current.

2. A controller of an electric power steering apparatus according to claim 1, wherein an output value of said dead band compensating circuit is an adding value of a fixing value and a change value which is proportional to said model current.

3. A controller of an electric power steering apparatus according to claim 1, wherein an output value of said dead band compensating circuit is a second change value proportional to said model current when said output value is a fixing value or less, and said output value is an adding value of said fixing value and a change value which is proportional to said model current when said output value is said fixing value or more.

4. A controller of an electric power steering apparatus according to claim 2 or 3, wherein said fixing value is a value determined from the characteristics of switching element constituting said inverter.

5. A controller of an electric power steering apparatus according to any one of claims 1 to 3, wherein said model current is an output value of a reference model circuit for setting said current command value to an input value and constructed by a first order lag function.

6. A controller of an electric power steering apparatus according to claim 2, wherein a hysteresis characteristic circuit is arranged in the input of said dead band compensating circuit.

7. A controller of an electric power steering apparatus according to claim 6, wherein a hysteresis width of said hysteresis characteristic circuit is calculated based on the rotating speed of said motor or said current command value.

8. A controller of an electric power steering apparatus according to a claim 4, wherein said model current is an output value of a reference model circuit for setting said current command value to an input value and constructed by a first order lag function.

* * * * *